Oct. 15, 1929.  J. R. WEAVER  1,731,403

MEASURING MACHINE

Filed Dec. 6, 1927  3 Sheets-Sheet 1

INVENTOR
James R. Weaver.
BY
ATTORNEY

Oct. 15, 1929.    J. R. WEAVER    1,731,403
MEASURING MACHINE
Filed Dec. 6, 1927    3 Sheets-Sheet 3

INVENTOR
James R. Weaver.
BY
*Wesley G. Carr*
ATTORNEY

Patented Oct. 15, 1929

1,731,403

UNITED STATES PATENT OFFICE

JAMES R. WEAVER, OF NORTH IRWIN, PENNSYLVANIA, ASSIGNOR TO WESTINGHOUSE ELECTRIC & MANUFACTURING COMPANY, A CORPORATION OF PENNSYLVANIA

MEASURING MACHINE

Application filed December 6, 1927. Serial No. 238,107.

My invention relates generally to measuring machines and more particularly to measuring machines of the type employed in rewinding paper into rolls of predetermined lengths for use in recording meters and the like.

The object of my invention, generally stated, is the provision of a measuring machine that shall be simple and efficient in operation and capable of being readily and economically manufactured.

A more specific object of the invention is to provide a measuring machine which may be set to make a predetermined measurement and which will, upon the completion of the measurement, automatically stop and re-set itself to repeat the measurement when it is again started in operation.

It is also an object of my invention to provide for preventing the holder of the material to be measured, from over-travelling or "drifting" after the completion of a predetermined measurement.

Other objects of the invention will, in part, be obvious and will, in part, appear hereinafter.

The invention, as disclosed in the accompanying drawings, comprises the structural features and the combination of elements and arrangement of parts which will be hereinafter set forth and particularly defined in the claims.

For a fuller understanding of the invention, reference may be had to the following detailed description, taken in connection with the accompanying drawings, in which, Figure 1 is a top-plan view of a measuring machine embodying my invention;

Figure 1:
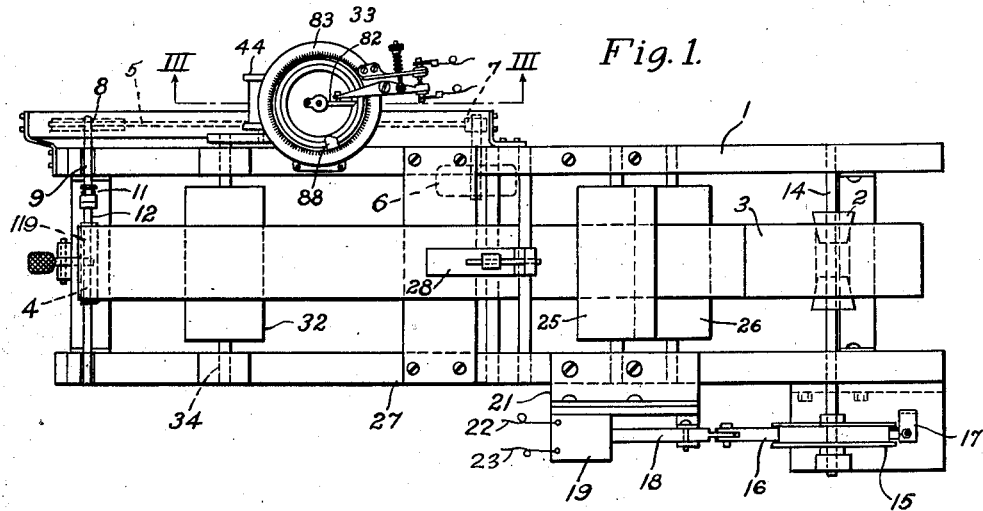
Figure 2:
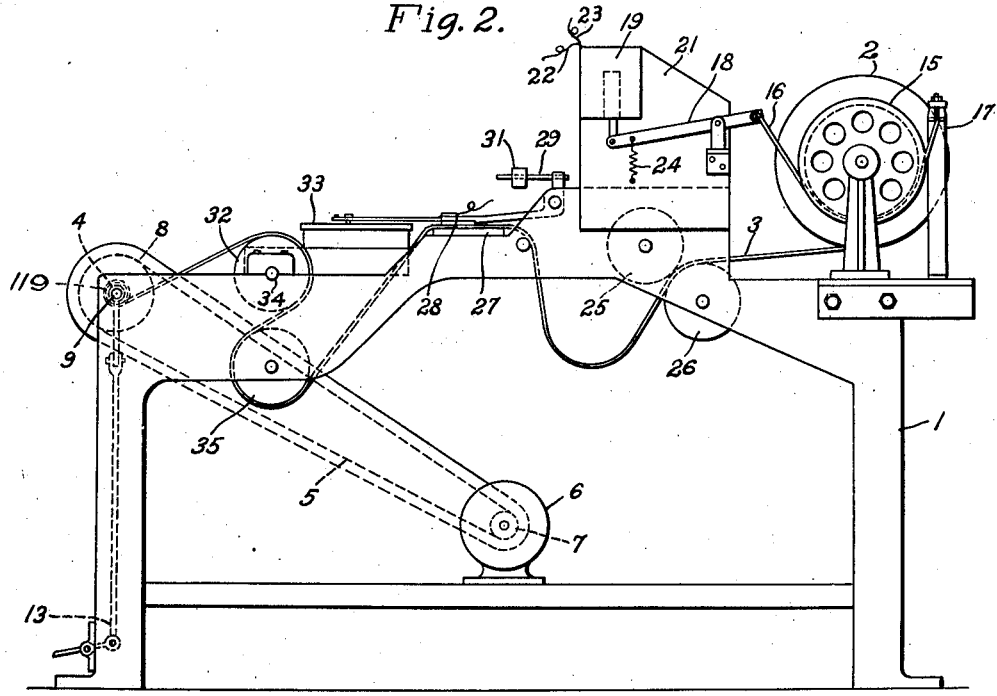
Fig. 2 is a view, in side elevation, of the machine shown in Fig. 1.
Figure 3:
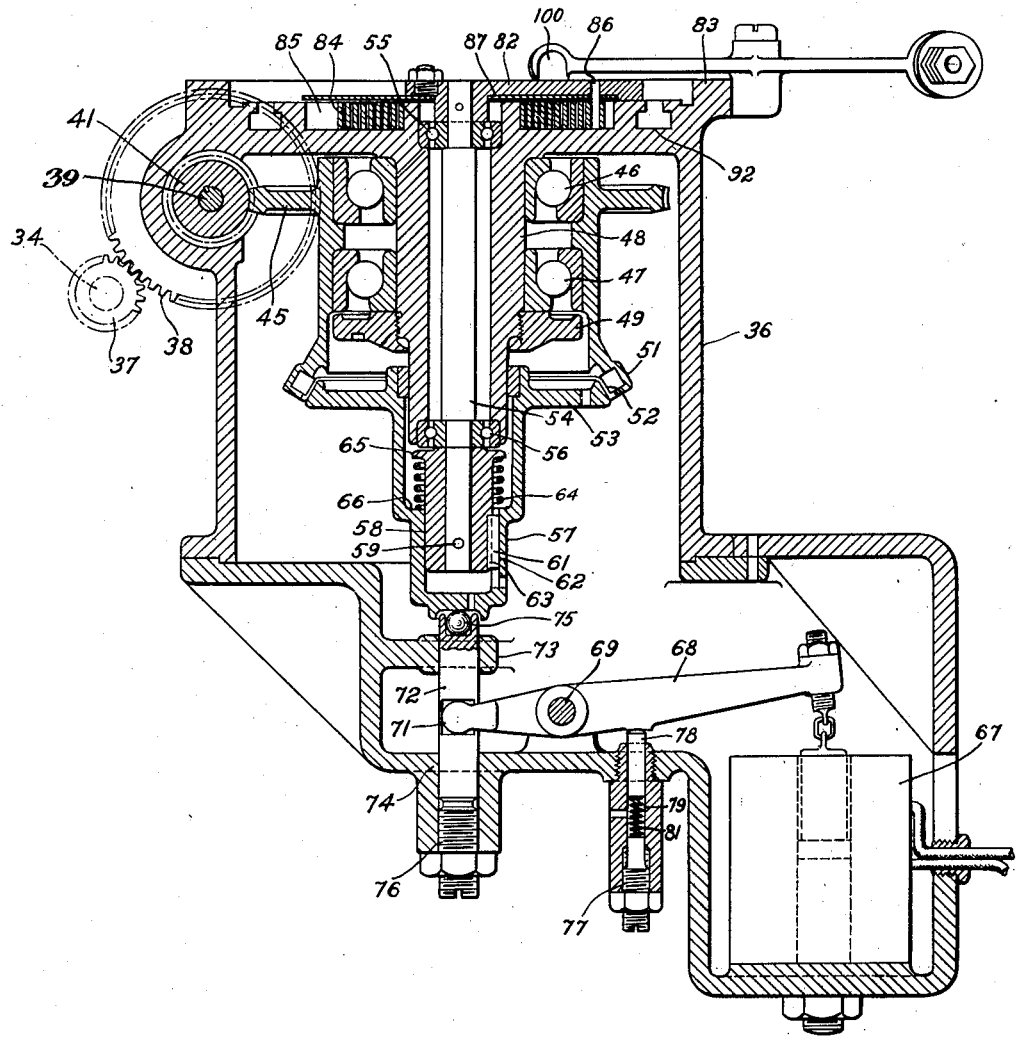
Fig. 3 is a view, in section, taken on the line III—III of Fig. 1.
Figure 4:
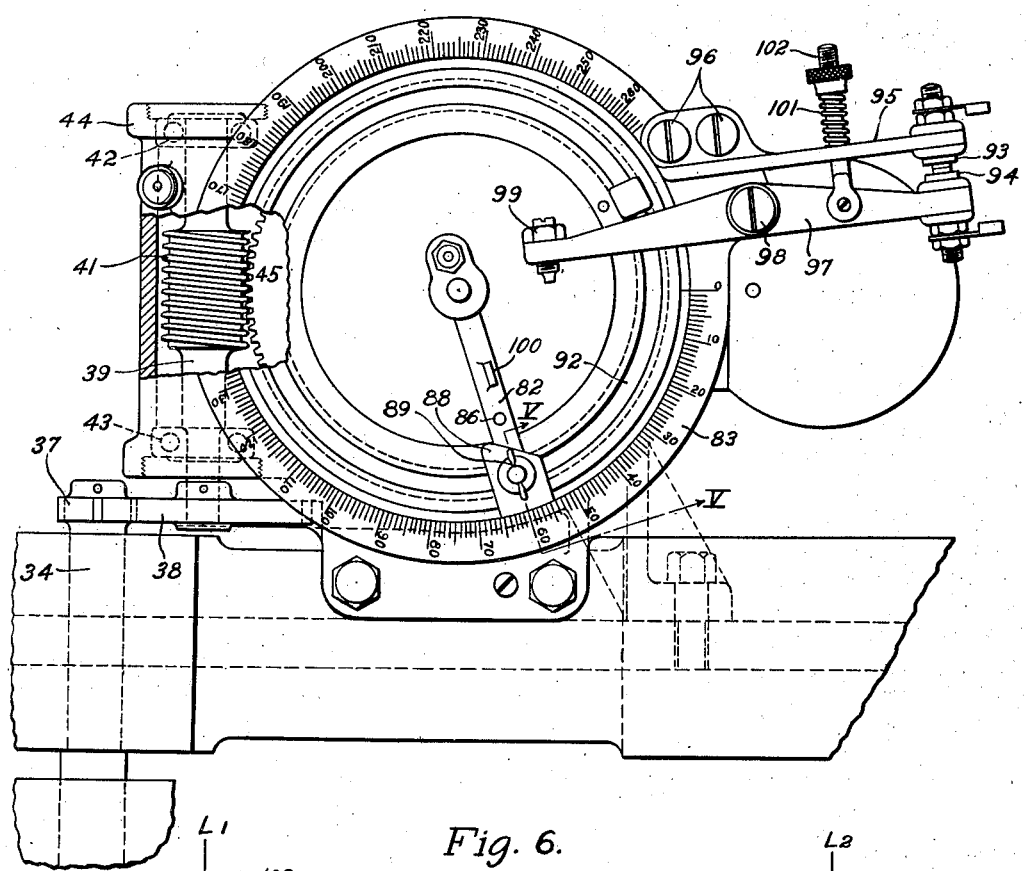
Fig. 4 is an enlarged top plan view of the metering device that constitutes a part of the measuring machine illustrated in Fig. 1.
Figure 6:
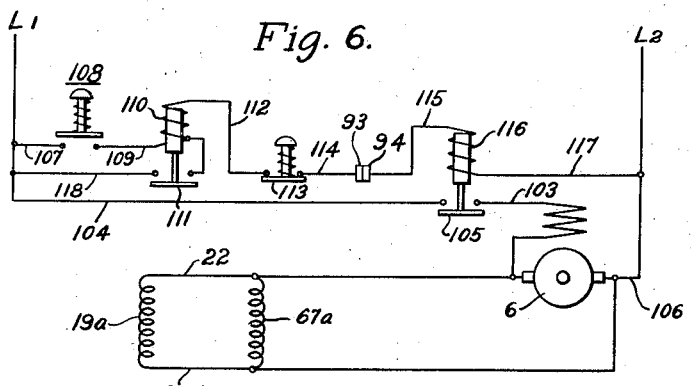
Fig. 6 is a diagrammatic view of the control circuits embodied in my invention.
Figure 5:
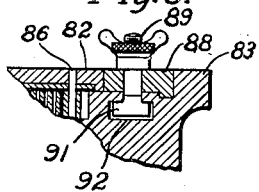
Fig. 5 is a view, in section, taken on the line V—V of Fig. 4.

The machine illustrated in the drawings is of the type in which large rolls of paper may be rewound into a plurality of small rolls of measured lengths for use in recording meters. The machine comprises a frame 1, a stock roll 2 upon which a large roll of paper 3 to be measured and re-wound, may be disposed and a winding-roll 4 upon which the paper is re-wound. The winding-roll 4 is driven through a belt 5 by means of an electric motor 6 which is mounted at a suitable point in the lower part of the frame 1.

One end of the belt 5 is mounted upon a pulley 7 on the motor, while its other end passes over a pulley 8 that is disposed on one end of a shaft 9 which is connected by a clutch 11 to the shaft 12 of the winding roll 4. The pulley clutch may be engaged or disengaged by the operator through a pedal operated clutch shifting mechanism 13 to facilitate the removal of completed rolls of paper and the replacing of the spools upon which new rolls are to be wound.

The stock roll 2 is also mounted upon a shaft 14 which may be removed from the frame 1 of the machine when it is desired to place a new roll of stock paper thereon.

As shown, one end of the shaft 14 of the stock roll is provided with a brake drum 15 that is adapted to receive a brake band 16. One end of the brake band 16 is secured to the upper part of an extended portion 17 of the machine frame 1, while its other end is secured to one end of a pivotally mounted brake lever 18. The other end of the brake lever is attached to a solenoid 19 that is mounted upon a supporting member 21 which is disposed upon the frame of the machine. The solenoid 19 is electrically connected, by means of conductors 22 and 23, in the circuit of the driving motor 6 in such a manner that the solenoid will be energized when the motor is operated and will be de-energized when the motor is stopped.

The braking lever 18 is biased toward a braking position by a spring 24, one end of which is attached to the frame of the machine and the other end of which is secured to the outer arm of the brake lever. It will, therefore, be seen that when the machine is in operation, the brake band will be released from the brake drum on the stock roll, but that as soon as the driving motor is stopped, the solenoid will be deenergized and the brake will be applied to the stock roll by the tension of the spring 24, thereby preventing any overrunning or "drifting" of the stock roll when paper is not being unwound from it.

In order that the paper 3 may be held under proper tension and may be properly guided as it moves from the stock roll 2 to the winding roll 4, the machine is provided with idling rolls 25 and 26 and a friction plate 27. A pressure plate 28 is mounted above the friction plate 27 in such a position that it may bear upon the upper surface of the paper 3 and press it against the friction plate. The pressure plate is provided with an arm 29 upon which a movable weight 31 is mounted, and the pressure exerted against the paper may be varied as desired by changing the location of the movable weight.

For the purpose of measuring the paper that is wound upon the winding roll, the machine is so designed that the paper will pass over and rotate a measuring roll 32 which is connected to and operates a metering device 33 that is disposed on the side of the frame at one end of the shaft 34 of the measuring roll.

Inasmuch as the paper is passed over the measuring roll 32 for the purpose of rotating the measuring roll and thereby actuating the metering device 33, it is advisable to provide for a large area of contact between the paper and the measuring roll. Therefore, a tensioning roll 35 is disposed underneath the measuring roll in such a position that the paper, in passing around it and over the measuring roll when it is being transferred to the winding roll 4, will be held in contact with approximately one-half the surface of the measuring roll and thus have a good frictional contact therewith.

The measuring roll 32 may be of any desired circumference but I prefer to employ one having a circumference of 12 inches so that the passage of one foot of the paper over the measuring roll will give it one rotation.

The metering device 33 for indicating the measurements made by the measuring roll is illustrated as constructed with a casing 36 that embodies a plurality of supports for the metering mechanism and also acts as a protective covering therefor.

In order that the metering device may be driven by the measuring roll, it is connected thereto through a pinion 37 and a gear wheel 38. The pinion 37 is secured to one end of the shaft 34 of the measuring roll 32 while the cooperating gear wheel 38 is mounted upon the shaft 39 of a worm gear 41 which is supported upon a pair of ball bearings 42 and 43 in a transverse cylindrical portion 44 of the casing 36. The worm gear 41 meshes with a worm wheel 45 that is mounted upon a pair of ball bearings 46 and 47 which are supported upon a hollow shaft or boss 48 that depends from the central portion of the top of the casing 36. The bearings 46 and 47 and the worm wheel 45 are held in position on the shaft 48 by a nut 49 that is threaded on the lower part thereof.

The lower part of the hub 51 of the worm wheel 45 is bell-shaped and its under surface is provided with a clutch facing 52 that is adapted to be engaged by a clutch member 53 that is attached to a spindle 54 which is rotatably supported in a vertical position in the hollow shaft 48 by a pair of ball bearings 55 and 56.

The clutch member is provided with an elongated hub 57 that is slidably disposed on a sleeve 58 which is mounted on the lower end of the spindle and is secured thereto by means of a pin 59. While the clutch member may be moved longitudinally on the sleeve, it is prevented from rotating thereon by a key 61 which is loosely lodged in cooperating slots 62 and 63 in the sleeve and the hub. For the purpose of biasing the clutch member to an inactive position, a coiled spring 64 is disposed around the sleeve 58 with its one end resting against a collar 65 on the sleeve and its other end resting against a shoulder 66 in the hub of the clutch member.

The lower part of the casing 36 is disposed to act both as a housing and as a support for a solenoid 67 which is employed to actuate the clutch member 53 from an inactive to an active position, where it will cause the rotation of the spindle 54 when the worm wheel 45 is rotated by the operation of the measuring roll. It will be noted that the solenoid is connected to the outer end of a straight lever 68 which is fulcrumed on an axle 69. The inner end of the lever is connected by a ball and socket joint 71 to an upright shaft 72 which is slidably disposed in a pair of bearings 73 and 74 underneath the lower end of the hub of the clutch member. A hardened steel ball 75 is disposed between the upper end of the shaft and the lower end of the clutch member to provide for a pivotal engagement so that the clutch member may rotate freely with the worm wheel and spindle while it is held in its active position.

The limit of the downward movement of the shaft 72 may be adjusted to meet operating conditions by means of a set screw 76 in the underpart of the lower bearing 74, and the upward movement may be limited by a set-screw 77 and pin 78 that are disposed in a well 79 underneath the outer arm of the straight lever 68. A coiled spring 81 is disposed between the pin and the set-screw in the well 79 for the purpose of balancing the weight of the lever and cushioning its downward movement.

The power for energizing the clutch solenoid 67 is obtained by connecting it across the armature of the driving motor 6.

As has been hereinbefore stated, the spindle 54 will be rotated by the measuring roll 32, through the gear train and the worm wheel, when the clutch member 53 is moved into its active position. In order that such movement may be indicated by the metering device 33, a pointer 82 is mounted on the upper end of the spindle 54 to cooperate with a dial 83 on the top of the casing 36.

When the clutch member 53 is in its active position the pointer 82 and the measuring roll 32 are connected in such manner that the pointer will be driven in a counter clockwise direction on the dial 83 when the measuring roll is rotated by the paper. In order that the pointer may be biased to return in a clockwise direction to its starting position when the clutch is disconnected, a clock spring 84 is disposed in an annular depression 85 in the top of the casing, with its inner end attached to the casing and its outer end secured to the pointer by a pin 86. A plate 87 covers and protects the clock spring.

A block or stop member 88 is mounted on the dial 83 for limiting the movement of the pointer in a clockwise direction. A thumb screw and a bolt 89 hold the stop block in position and it may readily be set at any point on the dial by reason of the fact that the head 91 of the bolt is disposed in an annular inverted T-shaped slot 92 which is located within the dial 83 and is concentric therewith.

In the machine illustrated in the drawings, the measuring roll 32 is presumed to have a circumference of one foot and the dial is calibrated to read from "0" to "265" feet, each step indicating one foot. The gear train between the measuring roll 32 and the pointer 82 is so proportioned that one revolution of the measuring roll will move the pointer to indicate a movement of one foot. It will be noted that the calibration on the dial 83 is arranged to read inversely to the movement of the pointer 82 when the pointer is being driven by the measuring roll 32. This arrangement is employed to enable the operator of the machine to set the stop block 88 at the point on the dial which corresponds to the measurement he desires to make. For instance, if the operator desires to wind sixty feet of paper on the re-winding roll 4, he will set the stop block 88 at "60" on the dial 83. When the clutch member 53 is out or disconnected, the pointer 82, by reason of the biasing action of the clock spring 84, will move in a clockwise direction until it is stopped by the stop block 88. With the pointer set against the stop block, if the clutch member is actuated to its "in" position and the measuring roll rotated, the pointer 82 will be moved in a counter clockwise direction until it reaches "0", thus indicating the completion of the measurement.

In order to stop the machine automatically when the desired measurement is completed, a pair of normally closed contact members 93 and 94 mounted on the casing 36 and electrically connected in series in the motor control circuit, are disposed to be separated by the pointer 82 when it is actuated to the "0" position on the dial 83, thereby breaking the motor control circuit and stopping the motor 6.

The stationary contact member 93 is supported by an arm 95 which is secured to the casing 36 by a pair of screws 96. The movable contact member 94 is disposed on the outer arm of a lever 97 which is fulcrumed on a screw 98 in the casing. The inner arm of the lever 97 is provided with a set-screw 99 which may be adjusted to be engaged by a projection 100 on the pointer 82 when the latter reaches the "0" point on the dial 83.

The normally closed position of the contact members 93 and 94 is maintained by a biasing spring 101 which is supported upon the outer end of an eye bolt 102 that extends through the stationary arm 95 and is secured to the outer arm of the lever 97.

In the light of the foregoing description, it will be seen that when the motor 6 is started, the clutch solenoid 67 becomes energized and moves the clutch member 53 to an active position, where it connects the worm wheel 45 and the spindle 54 so that any operation of the measuring roll 32 will effect a movement of the pointer 82 on the dial 83. If the movement of the pointer 82 on the dial 83 is continued long enough, the pointer will move to the "0" position on the dial and open the contact members 93 and 94 which will, in turn, open the motor circuit and de-energize the clutch solenoid 67, thus releasing the clutch member 53. The release of the clutch member 53 breaks the operative connection between the measuring roll 32 and the spindle 54 and thus permits the pointer 82 to be re-set against the stop block 88 by the biasing action of the clock spring 84.

The motor 6 may be operated from any suitable source of power and in this instance a power line comprising the line conductors L1 and L2 is shown. Many different types of control systems may be provided for connecting the motor across the power line and in this embodiment of the invention one responsive to push-button switches is utilized.

When the starting push-button switch 108 is closed a line-switch actuating circuit is closed which extends from supply line L1 through conductor 107, the contact members of the push-button starting switch 108, conductor 109, the actuating coil 110 of relay 111, conductor 112, the contact members of a push-button stop switch 113, conductor 114, the normally closed contact members 93 and 94 of the metering device 33, conductor 115, the actuating coil 116 of a line switch 105, and conductor 117 to the supply line L2 and the switch 105 is closed. A holding circuit for the line switch is established which extends from the supply line conductor L1 through conductor 118, the contact members of relay 111 and the actuating coil 110 of the relay to conductor 112.

When the line switch 105 is closed, a circuit for energizing the motor is completed from supply line L1 through conductor 104, the contact members of line switch 105, conductor 103, the motor 6, and conductor 106, to supply line L2.

The coil 67a of the solenoid 67 that actuates the meter clutch, and the coil 19a of the solenoid 19 that operates the stock roll brake lever 18 are connected across the armature of the motor 6, in order that they may be energized when the motor is in operation and be de-energized when the motor is stopped.

The operation of the machine is as follows: Assuming that it is desired to rewind a stock roll of paper into a plurality of rolls each of which will contain sixty feet of paper, then the stop block 88 is set at "60" on the dial 83, as illustrated in the drawings. A roll of stock paper 3 is placed upon the stock rolls and the free end of the paper is led between the idling rolls 25 and 26, over the frictional plate 27, around the tensioning roll 35 and over the measuring roll 32. A cardboard spool 119 is then placed on the winding roll 4 and the end of the paper is fastened to it. The operator then presses the push button starting switch 108, which closes the motor control circuit thereby energizing the line switch 105 to close the motor circuit and start the motor 6. The motor 6 operates the winding roll 4 through the belt 5 and thereby causes the paper 3 to be wound upon the spool 119 on the winding roll. At the instant the motor 6 starts, the brake solenoid 19 and the clutch solenoid 67 are energized by reason of the fact that they are connected in circuit across the armature of the motor 6.

The energizing of the brake solenoid 19 releases the brake band 16 on the brake drum 15 and permits the paper to be freely unrolled from the stock roll 2.

The energizing of the clutch solenoid 67 moves the clutch member 53 on the spindle 54 into engagement with the clutch face 52 on the hub 51 of the worm wheel 45. With the clutch member 53 in its active position, the movement caused by the rotation of the measuring roll 32 which is actuated by the paper 3 is transmitted through pinion 37, the gear 38, the worm gear 41, the worm wheel 45, the clutch member 53 and the spindle 54 to the pointer 82 and moves it from its starting position at the stop block 88 toward the "0" position. When the required length of paper 3 has passed over the measuring roll 32, the pointer 82 will reach the "0" position and engage the movable lever 97 and separate the contacts 93 and 94. The separation of the contacts 93 and 94 will open the control circuit and effect the opening of the line switch 105. The opening of the line switch 105 de-energizes the motor 6, the clutch solenoid 67 and the brake solenoid 19. Upon the de-energization of the clutch solenoid 67 the clutch member 53 will be released and moved to its inactive position by its biasing spring 64. The releasing of the clutch member 53 will free the spindle 54 from the worm wheel 45 and thereby permit the pointer 82 to be returned, by the biasing action of the clock spring 84, to its starting position against the stop block 88, thus resetting the machine to repeat the operation.

The deenergization of the brake solenoid 19 permits the brake to be applied to the stock roll 2 and thereby prevents the stock roll from "drifting" and unwinding the paper thereon while the machine is not in operation.

After the machine stops, the operator cuts the paper 3 near the winding roll 4 and removes the finished roll.

If it is desired to rewind another roll of the same length, the only action necessary on the part of the operator is to place a new spool on the rewinding roll 4, attach the paper 3 to it and press the push-button starting switch 108. The machine will then automatically rewind a roll of the desired length, come to a stop when the roll is completed and then reset itself ready to repeat the operation.

If it is desired to wind rolls of another length, say 200 feet, the machine may be set for such length by moving the stop block 88 on the dial 83 to the mark of "200" on the dial.

It will, therefore, be observed that, in winding a number of rolls of the same length, the operator does not need to give any attention to the metering device or to the stopping of the machine.

While the illustrated example constitutes a particular embodiment of my invention, I do not limit myself strictly to the details shown, since manifestly the same may be varied considerably without departing from the spirit of the invention as defined in the appended claims.

I claim as my invention:

1. In a measuring machine, the combination with means for moving the material to be measured and a motor for operating said means, of a measuring roll disposed to be operated by the material to be measured, a metering device, a clutch for operatively connecting the metering device and the measuring roll, and means disposed to be operated by the metering device upon the completion of a predetermined measurement to stop the motor.

2. In a measuring machine, the combination with means for moving the material to be measured, an electric motor for driving said means, a motor circuit for supplying current to the motor, and a line switch for the motor circuit, of a measuring roll disposed to be operated by the material to be measured, a metering device, a clutch for operatively connecting the metering device and the measuring roll, and means disposed to be actuated by the metering device upon the completion of a predetermined measurement to open the line switch to stop the motor.

3. In a measuring machine, the combination with means for moving the material to be measured, an electric motor for driving said means, a motor circuit for supplying current to the motor, a line switch for the motor circuit, a line switch actuating circuit, and a holding coil for said line switch, of a measuring roll disposed to be operated by the material to be measured, a metering device, a clutch for operatively connecting the metering device and the measuring roll, a pair of normally-closed contact members connected in the line switch actuating circuit, and means disposed to be operated by the metering device for opening the contact members to deenergize the holding coil and thereby open the line switch and stop the motor.

4. In a measuring machine, the combination with means for moving the material to be measured, an electric motor for driving said means, a motor circuit for supplying current to said motor, and a line switch for the motor circuit, of a measuring roll disposed to be operated by the material to be measured, a metering device, a clutch for connecting the measuring roll to drive the metering device, a solenoid for moving the clutch into an active position, said solenoid being connected in the motor circuit whereby it will be energized when the motor is energized, and means disposed to be actuated by the metering device upon the completion of a predetermined measurement to open the line switch, and thereby deenergize the motor.

5. In a measuring machine, the combination with means for moving the material to be measured, an electric motor for driving said means, a motor circuit for supplying current to said motor, and a line switch for the motor circuit, of a measuring roll disposed to be operated by the material to be measured, a metering device, a clutch for connecting the measuring roll to drive the metering device, means for biasing the clutch to an inactive position, a solenoid for moving the clutch into an active position, said solenoid being connected in the motor circuit whereby it will be energized when the motor is energized, and means disposed to be actuated by the metering device upon the completion of a predetermined measurement to open the line switch and thereby deenergize the motor.

6. In a measuring machine, the combination with a stock roll for the material to be measured, a winding roll for the measured material, an electric motor for driving the winding roll, a motor circuit for supplying current to the motor, and a measuring roll disposed to be driven by the material to be measured, of a brake for the stock roll, means for biasing the brake toward a braking position, and a solenoid for holding the brake in an ineffective position, said solenoid being connected in the motor circuit whereby it is energized when the motor is energized.

7. In a measuring machine, the combination with a stock roll for the material to be measured, a winding roll for the measured material, an electric motor for driving the winding roll, a motor circuit for supplying current to the motor, a line switch for the motor circuit, a measuring roll disposed to be driven by the material to be measured, and a metering device, of a clutch for operatively connecting the metering device and the measuring roll, a solenoid connected in the motor circuit for moving the clutch to an active position when the motor is energized, a brake for the stock roll, means for biasing the brake to a braking position, a solenoid connected in the motor circuit for withdrawing the brake when the motor is energized, and means disposed to be operated by the metering device upon the completion of a predetermined measurement to open the line switch.

8. In a measuring machine, the combination with means for moving the material to be measured, an electric motor for driving said means, a motor circuit for supplying current to said motor, a line switch for the motor circuit, a line switch actuating circuit, a measuring roll disposed to be operated by the material to be measured, of a metering device comprising a casing, a dial mounted in the casing, a spindle supported in the casing and a pointer mounted on the spindle in cooperative relation with the dial, a clutch for operatively connecting the spindle and the measuring roll, a solenoid connected in the motor circuit for moving the clutch to an active position when the motor is energized, and means disposed to be operated by the pointer upon the completion of a predetermined measurement to open the line switch.

9. In a measuring machine, the combination with means for moving the material to be measured, an electric motor for driving said means, a motor circuit for supplying current to said motor, a line switch for the motor circuit, a line switch actuating circuit, a measuring roll disposed to be operated by the material to be measured, of a metering device comprising a casing, a dial mounted in the casing, a spindle supported in the casing and a pointer mounted on the spindle in cooperative relation with the dial, a clutch for operatively connecting the spindle and the measuring roll, means for biasing the clutch to an inactive position, a solenoid connected in the motor circuit for moving the clutch to an active position when the motor is energized, and means disposed to be operated by the pointer upon the completion of a predetermined measurement to open the line switch.

10. In a measuring machine, the combination with means for moving the material to be measured, an electric motor for driving said means, a motor circuit for supplying current to said motor, a line switch for the motor circuit, a line switch actuating circuit, a measuring roll disposed to be operated by the material to be measured, of a metering device comprising a casing, a dial mounted in the casing, a spindle supported in the casing and a pointer mounted on the spindle in cooperative relation with the dial, a clutch for operatively connecting the spindle and the measuring roll, a solenoid connected in the motor circuit for moving the clutch to an active position when the motor is energized, a pair of normally closed contact members connected in the line switch actuating circuit, and means disposed to be actuated by the pointer upon the completion of a predetermined measurement to open the contact members to deenergize the line switch.

11. In a measuring machine, the combination with means for moving the material to be measured, an electric motor for driving said means, a motor circuit for supplying current to said motor, a line switch for the motor circuit, a line switch actuating circuit, a measuring roll disposed to be operated by the material to be measured, of a metering device comprising a casing, a dial mounted in the casing, a spindle supported in the casing, a pointer mounted on the spindle in cooperative relation with the dial, an adjustable block mounted on the dial to limit the movement of the pointer to the position which indicates the measurement to be made, a clutch for operatively connecting the spindle and the measuring roll, a solenoid connected in the motor circuit for moving the clutch into active position when the motor is energized, and means disposed to be operated by the pointer when it is moved to zero position by the measuring roll to open the line switch.

12. In a measuring machine, the combination with means for moving the material to be measured, an electric motor for driving said means, a motor circuit for supplying current to said motor, a line switch for the motor circuit, a line switch actuating circuit, a measuring roll disposed to be operated by the material to be measured, of a metering device comprising a casing, a dial mounted in the casing, a spindle supported in the casing, a pointer mounted on the spindle in cooperative relation with the dial, an adjustable block mounted on the dial to limit the movement of the pointer to the position which indicates the measurement to be made, and means for biasing the pointer toward the adjustable block, a clutch for operatively connecting the spindle and the measuring roll, a solenoid connected in the motor circuit for moving the clutch into active position when the motor is energized, and means disposed to be operated by the pointer when it is moved to zero position by the measuring roll to open the line switch.

13. In a measuring machine, the combination with means for moving the material to be measured, an electric motor for driving said means, a motor circuit for supplying current to the motor, a line switch for the motor circuit, and a measuring roll disposed to be operated by the material to be measured, of a metering device comprising a casing, a spindle disposed therein, a pointer actuated by the spindle, a dial provided with a scale for indicating the distance to be traveled by the pointer in making a predetermined measurement, a block associated with the dial for limiting movement of the pointer, a clutch for operatively connecting the spindle to the measuring roll, means for biasing the clutch to an inactive position, means controlled by the operation of the motor for moving the clutch to an active position, and means disposed to be actuated by the pointer upon the completion of a predetermined measurement for opening the line switch.

14. In a measuring machine, the combination with means for moving the material to be measured, an electric motor for driving said means, a motor circuit for supplying current to the motor, a line switch for the motor circuit, and a measuring roll disposed to be operated by the material to be measured, of a metering device comprising a casing, a spindle supported by the casing, a clutch for operatively connecting the spindle and the measuring roll, a solenoid connected in the motor circuit and disposed to move the clutch to an active position when the motor is energized, a pointer actuated by the spindle, a dial provided with a scale reading inversely to the movement of the measuring roll, an adjustable block for limiting the pointer to a point on the scale which will indicate the measurement to be made, and a spring for biasing the pointer toward the block.

15. A metering device for measuring machines comprising a casing, a spindle rotatably mounted in the casing, a clutch through which the measuring machine may drive the spindle, means for biasing the clutch to an inactive position, and means governed by the operation of the measuring machine for moving the clutch to an active position, a dial mounted upon the casing and provided with a scale of measurements, a pointer disposed to be moved over the dial by the spindle, a contact member mounted upon the casing, a second contact member movably mounted upon the casing in cooperative relation with the first named contact member and disposed to be moved by the pointer at the end of its metering movement, and a block disposed upon the dial to limit the movement of the pointer to the proper position for starting the metering movement.

16. A metering device for measuring machines comprising a casing, a spindle rotatably mounted in the casing, a clutch through which the measuring machine may drive the spindle, means for biasing the clutch to an inactive position, and means governed by the operation of the measuring machine for moving the clutch to an active position, a dial mounted upon the casing and provided with a scale of measurements, a pointer disposed to be moved over the dial by the spindle, a contact member mounted upon the casing, a second contact member movably mounted upon the casing in cooperative relation with the first named contact member and disposed to be moved by the pointer at the end of its metering movement, a block disposed upon the dial to limit the movement of the pointer to the proper position for starting the metering movement, and means for biasing the pointer toward the block.

17. A metering device for measuring machines comprising a casing, a spindle rotatably mounted in the casing, a clutch through which the measuring machine may drive the spindle, means for biasing the clutch to an inactive position, and means governed by the operation of the measuring machine for moving the clutch to an active position, a dial mounted upon the casing and provided with a scale of measurements, a pointer disposed to be moved over the dial by the spindle, a contact member mounted upon the casing, a second contact member movably mounted over the casing in cooperative relation with the first named contact member and disposed to be moved by the pointer at the end of its metering movement, an adjustable block disposed upon the dial to limit the movement of the pointer to the proper position for starting the metering movement, and means for biasing the pointer toward the block.

18. A metering device for measuring machines comprising a casing, a spindle rotatably mounted in the casing, a clutch through which the measuring machine may drive the spindle, means for biasing the clutch to an inactive position, a solenoid for moving the clutch to an active position, a dial mounted upon the casing and provided with a scale of measurements, a pointer disposed to be moved over the dial by the spindle, a stationary contact member mounted upon the casing, a movable contact member mounted upon the casing in cooperative relation with the stationary contact member and disposed to be actuated by the pointer at the end of its metering movement, a block disposed upon the dial to limit the movement of the pointer to the proper position for starting a metering movement, and means for biasing the pointer away from the movable contact member.

19. A metering device for measuring machines comprising a casing, a spindle rotatably mounted in the casing, a clutch through which the measuring machine may drive the spindle, means for biasing the clutch to an inactive position, a solenoid for moving the clutch to an active position, a dial mounted upon the casing and provided with a scale of measurements, a pointer disposed to be moved over the dial by the spindle, a pair of normally closed contact members mounted upon the casing, a lever for opening the contact members disposed to be actuated by the pointer at the end of its metering movement, a block disposed upon the dial to limit the movement of the pointer to the desired position for starting a metering movement, and means for biasing the pointer toward the block.

In testimony whereof, I have hereunto subscribed my name this 3rd day of December, 1927.

JAMES R. WEAVER.